United States Patent [19]

Horton

[11] Patent Number: 4,900,401

[45] Date of Patent: Feb. 13, 1990

[54] CONTINUOUS PYROLYSIS SYSTEM FOR TIRE SHREDS

[76] Inventor: Norman P. Horton, 6918 Greenback La., Citrus Heights, Calif. 95610

[21] Appl. No.: 209,054

[22] Filed: Jun. 20, 1988

[51] Int. Cl.[4] .......................... C10B 1/00; C10B 7/00; C10B 31/00

[52] U.S. Cl. ................................... 202/117; 110/229; 201/25

[58] Field of Search ....................... 110/229, 242, 346; 201/25, 2.5; 202/117

[56] References Cited

U.S. PATENT DOCUMENTS

| | | | |
|---|---|---|---|
| 1,293,285 | 2/1919 | Wood | 110/230 |
| 3,648,630 | 3/1972 | Hobbs et al. | 110/250 X |
| 3,707,355 | 12/1972 | Anderson | 110/250 X |
| 4,052,265 | 10/1977 | Kemp | 201/25 X |
| 4,084,521 | 4/1978 | Herbold et al. | 110/242 |
| 4,311,102 | 1/1982 | Kolze et al. | 110/105 |
| 4,402,791 | 9/1983 | Brewer | 201/25 X |
| 4,648,328 | 3/1987 | Keough | 110/229 |

Primary Examiner—Edward G. Favors

Attorney, Agent, or Firm—Owen, Wickersham & Erickson

[57] ABSTRACT

A continuous pyrolysis system is adapted for continuous pyrolysis of tire shreds with the simultaneous recovery of solid, liquid, and gas pyrolysate. The pyrolysis system includes an anaerobic pyrolyzing chamber with a conveyor for conveying tire shreds therethrough from an infeed end to a solids output end, and a heater for pyrolyzing the tire shreds as they are conveyed. The system also includes a solid pyrolysate output device for removing solid pyrolysate from the chamber, a liquid and gas pyrolysate output device for removing liquid and gas pyrolysate from the chamber, and a tire shred infeed device for feeding tire shreds into the chamber without interrupting either the pyrolysis of tire shreds already in the chamber, or the removal of pyrolystate from the chamber. The tire shred infeed device, and pyrolysate removal devices are each adapted for operation without the introducing substantial amounts of air into the chamber and without allowing substantial amounts of pyrolysate to escape into the atmosphere.

4 Claims, 8 Drawing Sheets

CONTINUOUS PYROLYSIS SYSTEM FOR TIRE SHREDS

This invention relates to pyrolysis systems and more particularly to apparatus and method for continuous pyrolysis of tire shreds with recovery of gas, liquid, and solid pyrolysate.

BACKGROUND OF THE INVENTION

Vehicle tire shreds can be reduced through anaerobic pyrolysis to produce solid pyrolysate in the form of carbon black and fluid pyrolysate in the form of valuable hydrocarbon liquids and gases.

Prior tire-shred pyrolysis systems have operated on a batch basis, that is, one "batch" of tire shreds is pyrolyzed at a time with intervening steps in which no pyrolysis takes place. The main component of a batch pyrolysis system is a pyrolysis chamber with at least one sealable opening through which tire shreds are fed into the chamber and solid pyrolysate is removed. The prior pyrolysis systems also include heating means for heating the tire shreds in the sealed pyrolysis chamber to a pyrolyzing temperature, and a purging system to purge the sealed pyrolysis chamber of air prior to heating each batch.

According to the batch pyrolyzing process, tire shreds are first loaded into the pyrolyzing chamber and the chamber is then sealed. The entire chamber is next purged of air to remove oxygen which would otherwise react with the hydrocarbon gases and liquids liberated during pyrolysis. The contents of the chamber are then heated to a pyrolyzing temperature for a sufficient period of time to pyrolyze the enclosed tire shreds. After the period of heating time required for complete pyrolysis of the enclosed tire shreds, the chamber is opened, the solid pyrolysate is removed, and the chamber is cleaned in preparation for the next batch.

The prior pyrolysis systems have proven inadequate for several reasons. First, the prior systems were very laborintensive since the chamber had to be manually loaded, sealed, opened, and then cleaned for each batch. The prior systems were also wasteful in that valuable gas and liquid pyrolysate was not recovered. Prior systems also released pyrolysate gas into the atmosphere, which was not only wasteful, but also harmful to the environment. Furthermore, since the entire chamber and its contents had to be reheated for each tire-shred batch, the prior systems made very inefficient use of heating energy.

It is therefore an object of the invention to provide a continuous tire-shred pyrolysis system in which tire-shred input, pyrolysate output, and pyrolysis all occur simultaneously.

Another object of the invention is to provide a continuous tire-shred pyrolysis system that recovers solid, liquid, and gas pyrolysate.

A further object of the invention is to provide a tire-shred pyrolyzing system that makes efficient use of pyrolyzing energy.

SUMMARY OF THE INVENTION

The pyrolysis system according to this invention encompasses both method and apparatus for continuous pyrolysis with the recovery of solid, liquid, and gas pyrolysate.

The method of the invention includes feeding tire shreds into an anaerobic pyrolyzing chamber, conveying the shreds through the chamber, and heating the shreds to a pyrolyzing temperature as they are conveyed through the chamber. The method also includes removing the resulting solid and fluid pyrolysate from the chamber. Unlike prior systems, tire-shred infeed, pyrolysis, and pyrolysate output are performed simultaneously, so that pyrolysis occurs continuously. Continuous pyrolysis is possible because the steps of feeding tires into the chamber and removing pyrolysate are performed without introducing substantial amounts of air into the pyrolyzing chamber, and also without allowing substantial amounts of pyrolysate gas to escape from the pyrolysis system into the atmosphere.

The apparatus pursuant to the invention includes an anaerobic pyrolysis chamber, tire-shred infeed means for feeding tire shreds into the chamber, pyrolysate output means for removing both solid and fluid pyrolysate from the pyrolyzing chamber, and gas purging means for purging the pyrolysis chamber and parts of the pyrolysate output means of air prior to start-up of the pyrolysis system.

In a preferred form, the anaerobic pyrolyzing chamber is elongated with an infeed end and a solids output end, and is supported horizontally by a suitable substructure. The chamber includes conveyor means for conveying tire shreds and resulting solid pyrolysate through the chamber, and heating means for supplying the heat necessary for pyrolyzing the tire shreds as they are conveyed through the chamber. Also, the chamber preferably includes a liquid drain pan running substantially the entire length of the conveyor means, in position to collect liquid pyrolysate which is released into the chamber as the tire shreds are pyrolyzed.

The conveyor means preferably comprises a conveyor belt carried on drums located at the infeed and solids output ends of the pyrolyzing chamber, and supported along its top and return flights by a belt supporting structure. At least one of the conveyor drums is driven by an appropriate motor to drive the conveyor belt. The belt is permeable to fluid pyrolysate yet capable of supporting substantially all solid pyrolysate and any unreacted contaminating solids such as steel belt material. A preferred form of the conveyor means also includes a belt adjusting and tensioning means to keep the belt taut even though its length may change substantially in operation due to thermal expansion and contraction.

In a preferred form of the invention, the drain pan is positioned between the top and return flights of the conveyor belt, and slopes transversely across the chamber for draining liquid pyrolysate towards a drain side of the pyrolyzing chamber. The heating means preferably includes a number of electrical heating elements or rods mounted inside the pyrolyzing chamber just above the top flight of the conveyor belt, in position to heat the tire shreds supported on the belt. The heating elements are preferably controlled to gradually heat the tire shreds as they are conveyed through the chamber. In a preferred form, the heating elements are arranged in sections, each section being separately controlled by a thermostatically operated heating control means to provide the gradual heating from the infeed end of the chamber to the output end.

Since the distance between the heating elements and the tire shreds supported on the conveyor belt is critical, the pyrolyzing chamber also preferably includes a tire shred levelling means for levelling the shreds on the belt near the input end of the chamber. In a preferred form of the invention, the levelling means comprises a levelling member that extends transversely across the chamber a proper distance above the belt. The levelling member meters out a uniform layer of shreds as the shreds pass by on the conveyor belt.

As tire shreds travel through the chamber, they are gradually pyrolyzed, forming liquid pyrolysate in the form of liquid hydrocarbons, gas pyrolysate in the form of hydrocarbon gases, and solid pyrolysate in the form of carbon black. Other solids may be included in the tire shreds such as polyester or steel belt material; these solids remain intact and are removed with the solid pyrolysate. The conveyor belt is driven at a speed giving the tire shreds sufficient residence time in the chamber, and sufficient heat is supplied by the heating means, so that the tire shreds are completely pyrolyzed as they travel from the input end to the opposite outlet end of the chamber. Liquid pyrolysate drains through the conveyor belt and gas pyrolysate is released into the pyrolyzing chamber, leaving only solid pyrolysate and other unreacted solids remaining suspended on the conveyor belt. Thus, the pyrolysate is separated into its fluid and solid constituents in the pyrolyzing chamber.

The continuous pyrolysis system includes special infeed means for feeding tire shreds into the pyrolyzing chamber without substantial introduction of air into the chamber and without substantial loss of pyrolysate gas from the chamber. Also, the pyrolysis system includes output means for removing solid, liquid, and gas pyrolysate from the pyrolyzing chamber without allowing a substantial amount of air to enter the chamber, and without allowing a substantial amount of pyrolysate gas to escape into the atmosphere. Furthermore, the pyrolysis chamber itself is specially adapted and operated to prevent contamination by oxygen, and to prevent the loss of pyrolysate gas.

The tire shred infeed means is mounted at the infeed end of the pyrolyzing chamber in position to deposit shreds on the conveyor belt within the chamber. In a preferred form, the infeed means includes a hopper with an upper hopper portion mounted above a hopper throat portion. The hopper throat portion includes a rotating air lock, preferably comprising a horizontally mounted tubular casing with upper and lower openings, and a coaxial horizontal infeed shaft mounted for rotation about the horizontal axis of the casing and having a number of sealing blades mounted thereon. The sealing blades are mounted on the infeed shaft at different angular orientations and extend radially from the shaft sufficiently to substantially abut an provide a seal against the inner wall of the casing, but also allowing the infeed shaft to be rotated about its horizontal axis by a suitable infeed motor mounted outside the hopper. Also, the sealing blades are arranged at angular orientations on the infeed shaft such that regardless of the angular orientation of the infeed shaft about its rotational axis within the casing, at least two of the sealing blades provide a seal against the casing. The sealing blades thus prevent gas from flowing through the air lock, and through the upper and lower casing openings.

As the infeed shaft is rotated by the infeed motor, tire shreds may pass by gravity feed from the upper portion of the hopper down through the upper casing opening into the areas between adjacent sealing blades. As the shaft rotates further, the tire shred-filled area between adjacent sealing blades eventually passes the lower casing opening at which point the tire shreds fall downward through the lower casing opening into a lower throat area of the hopper, that is preferably inside the pyrolyzing chamber, directly above the conveyor belt.

Thus, the air lock feeds tire shreds into the pyrolyzing chamber, yet provides a constant seal which prevents gas from flowing therethrough. Furthermore, the hopper is preferably adapted to be operated with its lower throat area substantially full of tire shreds. When the pyrolysis system is operated with the lower hopper throat area full of tire shreds, the shreds themselves act to block the flow of gas through the hopper.

The pyrolysate output means includes separate solid pyrolysate output means and fluid pyrolysate output means. The solid output means includes a solids output chute located at the solids output end of the chamber, in position to receive solid pyrolysate as it falls off the conveyor belt as the belt travels around the drum at the solids output end of the chamber. The solids output chute has a bottom that extends down a substantial distance below the level of the chamber and in which solid pyrolysate collects during operation of the system. An auger or screw type conveyor is mounted horizontally in the bottom of the chute, extending across the bottom of the chute and out one side thereof into an auger casing. The auger operates to convey solid pyrolysate out of the chute, into the auger casing, and finally out an opening in the auger casing. The layer of solid pyrolysate that collects in the bottom of the output chute around the auger acts as a seal to prevent air from entering the chute, and also to prevent gas in the upper part of the chute from escaping. Also, the opening in the auger casing preferably includes a cover for sealing the opening to prevent gas from entering or exiting before a sufficient sealing level of solid pyrolysate collects in the chute.

The fluid pyrolysate output means includes a drain manifold for draining fluid pyrolysate from the pyrolyzing chamber to a gas outlet line and to a liquid pyrolysate output means. In a preferred form the drain manifold is mounted along one side of the pyrolyzing chamber in position to drain liquid pyrolysate, which collects above the drain pan in the pyrolyzing chamber. The drain manifold feeds liquid pyrolysate into the liquid output means, and allows gas pyrolysate to separate and exit the system through a gas outlet line, which may lead to gas conditioning equipment such as a gas condenser.

In a preferred form, the liquid output means includes a U-section, which connects the drain manifold to an intermediate tank, and an output tank. When the pyrolysis system is started and during operation, the U-section is filled with liquid which blocks the flow of gas into or out of the manifold through the U-section. In operation, liquid pyrolysate flows primarily by gravity feed from the drain manifold into the U-section, from the U-section into the intermediate tank, and from the intermediate tank into the output tank through a connecting line. The liquid pyrolysate that collects in the output tank is removed by a suitable pump to maintain the level of liquid in the output tank at or below the level of the connecting line.

As discussed above, the pyrolysis of tire shreds must be anaerobic in order to recover the valuable hydrocarbons that make up the liquid and gas pyrolysate. After operating a sufficient length of time, the pyrolyzing chamber, solids output chute, and drain manifold are filled with pyrolysate, mostly gas pyrolysate together with a small volume of liquid pyrolysate. To help the infeed and output means from allowing air to enter the chamber, a slight positive gas pressure is maintained on the pyrolyzing chamber, the solids output chute, and the drain manifold. During operation, this gas pressure may be supplied by pyrolysate gas as it is liberated from the tire shreds. The operating pressure is controlled substantially by the liquid level and gas pressure in the intermediate tank of the liquid pyrolysate output means.

To provide anaerobic pyrolysis at system start-up, the entire pyrolyzing chamber, fluid output manifold, and output chute must be purged of air. This purging is preferably accomplished with a gas purging system which fills the necessary areas with a suitable purge gas such as nitrogen, for example. As the pyrolyzing system is operated, the purge gas is displaced by the gas pyrolysate and is removed from the system through the fluid output means similarly to the removal of the gas pyrolysate.

These and other objects, advantages and features of the invention will be apparent from the following description of preferred embodiments, considered along with the accompanying drawings.

DESCRIPTION OF THE PREFERRED EMBODIMENTS

Figure 1:
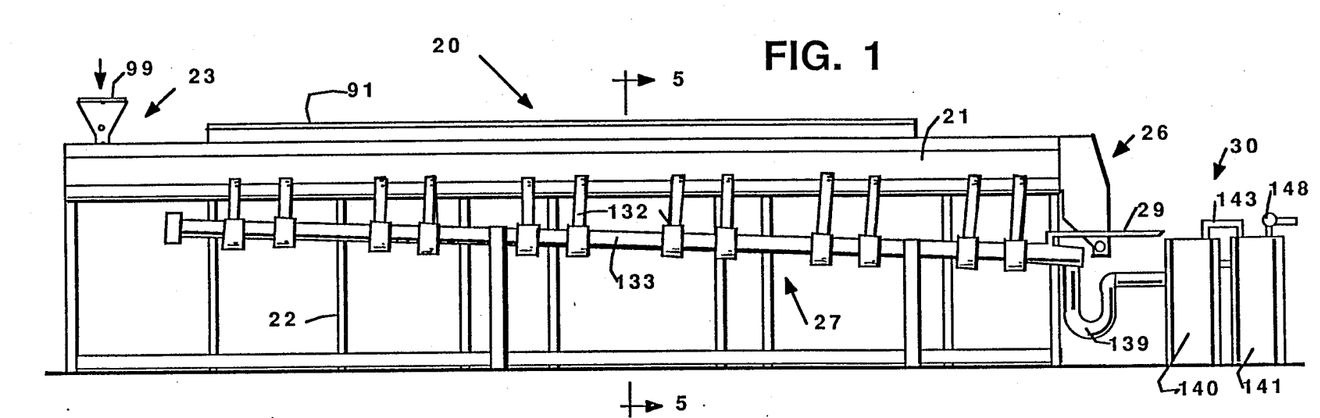
FIG. 1 is a view in side elevation of a continuous tire-shred pyrolysis system embodying the principles of the invention.
Figure 2:
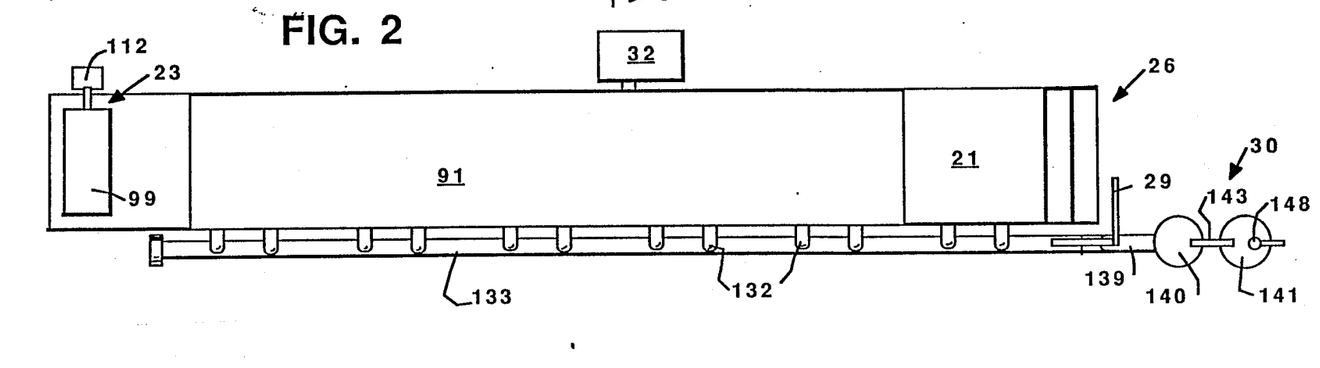
FIG. 2 is a top plan view of the pyrolysis system shown in FIG. 1.

As shown in FIGS. 1 and 2, a continuous pyrolyzing system 20 pursuant to the invention includes an elongated pyrolyzing chamber 21 mounted on a substructure 22. The system 20 also includes an infeed means 23 for feeding tire shreds to the chamber 21, and solid pyrolysate output means 26 for removing solid pyrolysate from the chamber. A fluid pyrolysate drain manifold 27, positioned along one side of the pyrolyzing chamber 21, a gas outlet line 29, and a liquid pyrolysate output means 30 cooperate to remove fluid pyrolysate from the chamber 21. The pyrolyzing system 20 also includes an oxygen purging system shown schematically at reference number 32 in FIG. 2.

Figure 3:
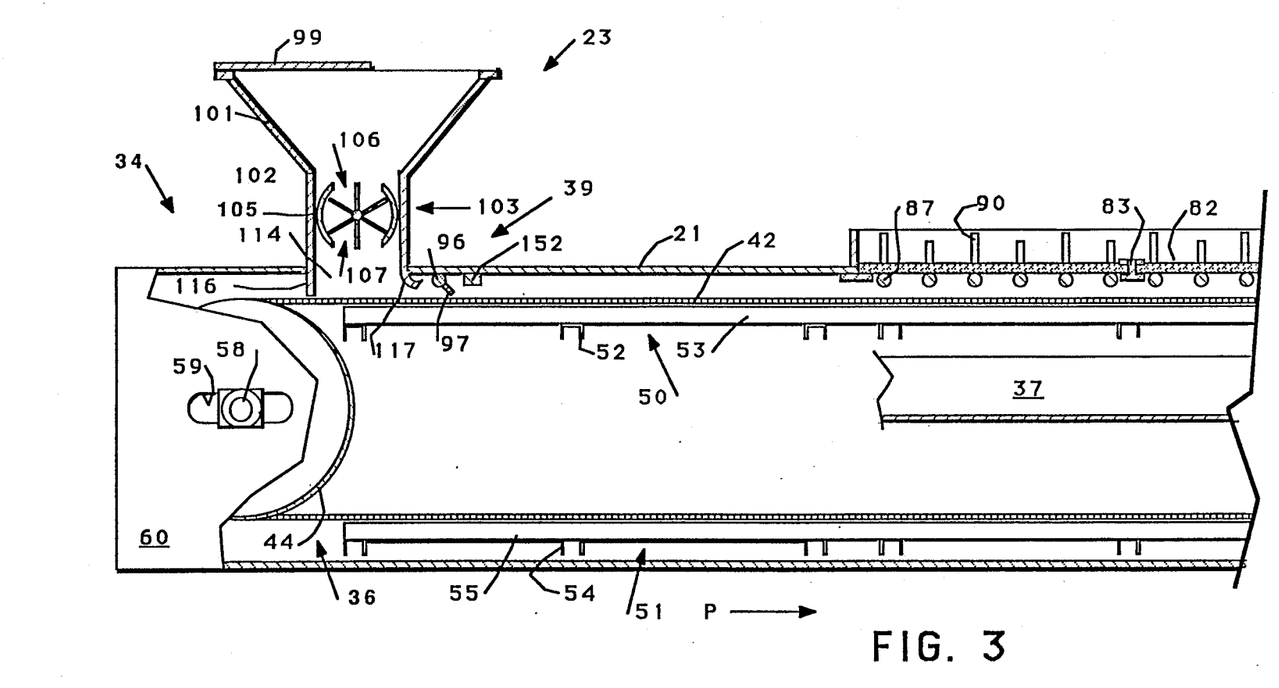
FIG. 3 is a view in side elevation and in section on an enlarged scale of the infeed end portion of the pyrolyzing chamber of FIGS. 1 and 2.
Figure 4:
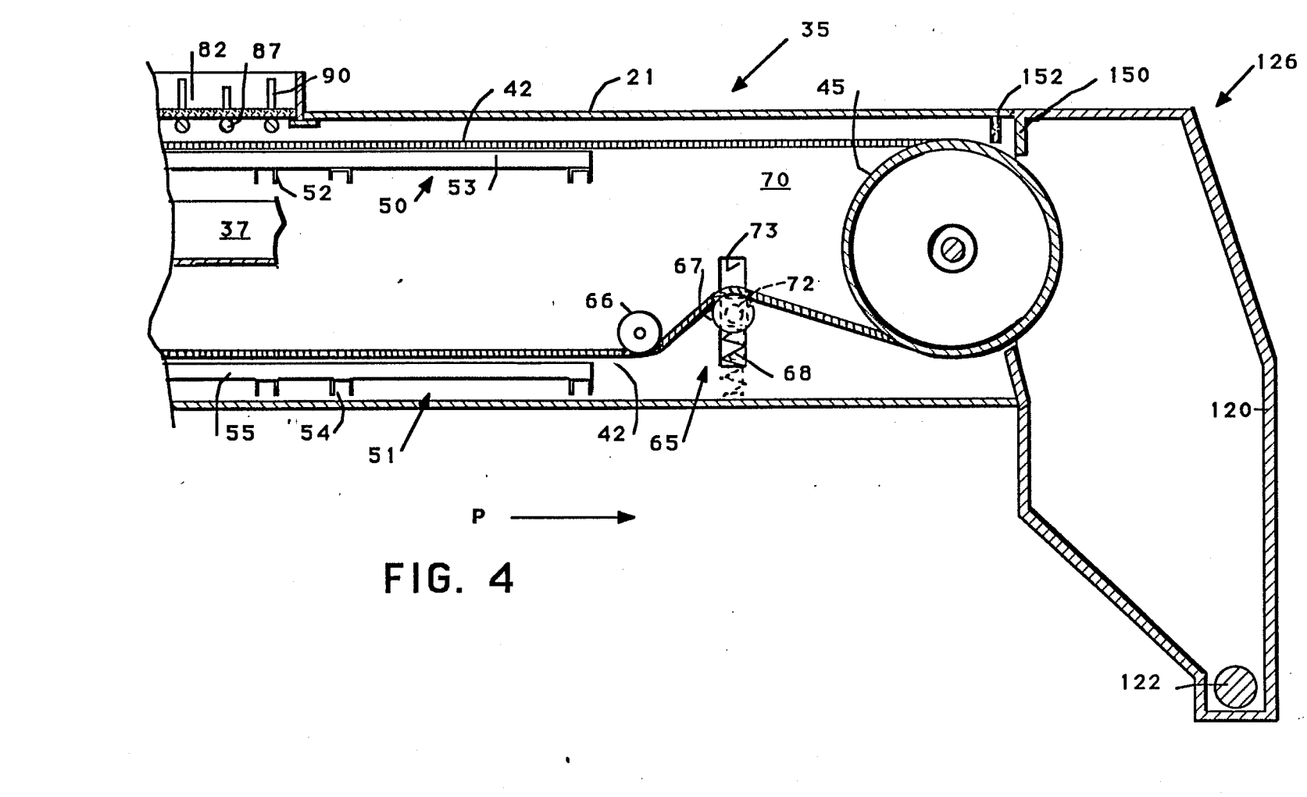
FIG. 4 is a view in side elevation and in section on an enlarged scale of the solids output end portion of the pyrolyzing chamber of FIGS. 1 and 2.

As illustrated in FIGS. 3 and 4, the pyrolyzing chamber 21 has an infeed end 34 and a solids output end 35, and includes a conveyor means 36, drain pan 37, and tire-shred levelling means 39.

The conveyor means 36 transports the tire shreds and solid pyrolysate through the pyrolyzing chamber 21 in the processing direction indicated by arrow P, and includes a conveyor belt 42 carried on conveyor drums 44 and 45, located at opposite ends of the pyrolyzing chamber. The belt 42 is preferably made of stainless steel and has a mesh that is fine enough to support the tire shreds and solid pyrolysate but is still permeable to liquid and gas pyrolysate. In the illustrated form of the invention, the conveyor drum 45 is driven by a suitable conveyor motor 47, shown diagrammatically in FIG. 5.

Figure 5:
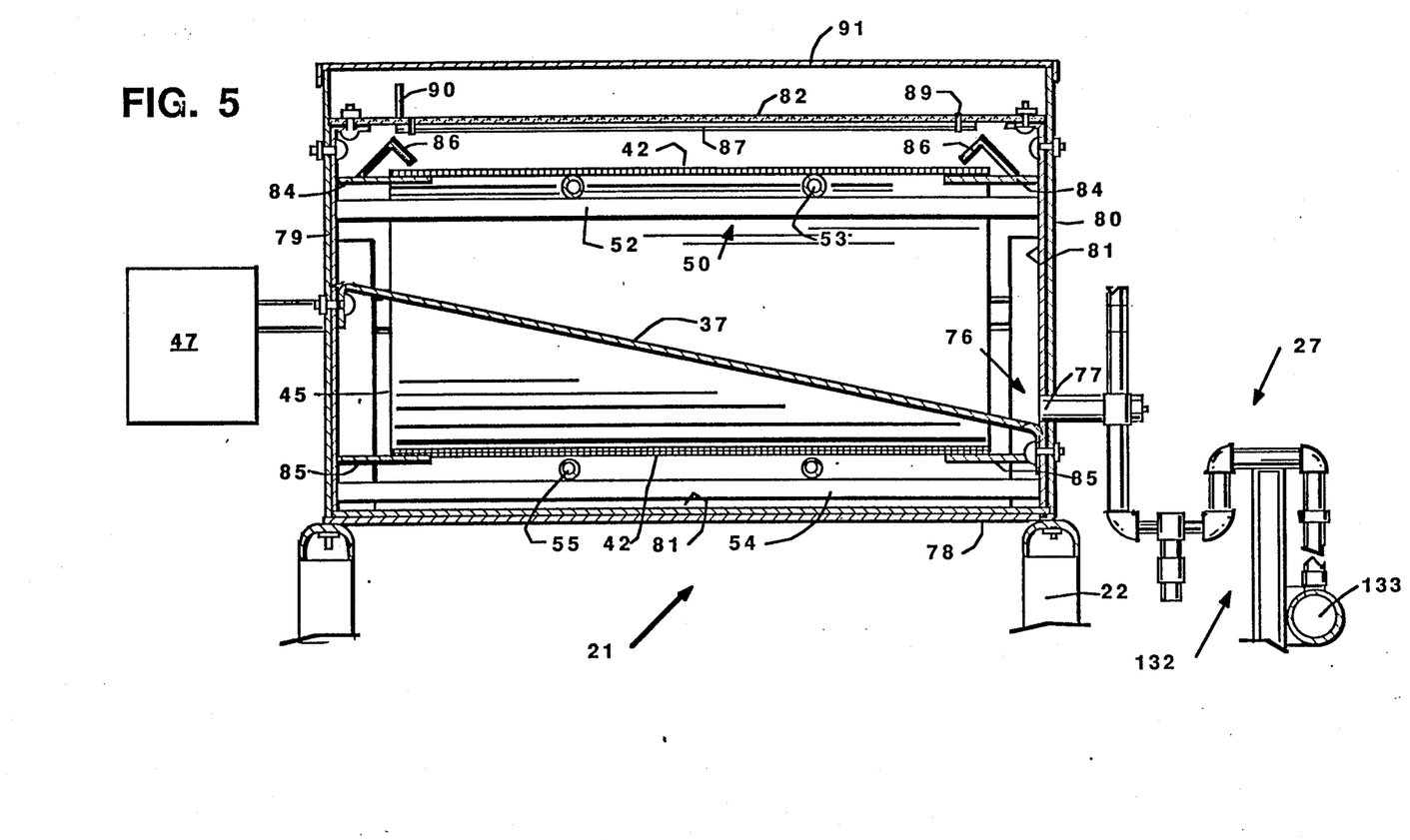
FIG. 5 is an enlarged view in transverse section of the pyrolyzing chamber, taken along line 5—5 in FIG. 1.

FIGS. 3-5 show a top support means 50 for supporting the conveyor belt 42 along its top flight and a return support means 51 for supporting the belt along its return flight. The top support means 50 comprises a number of transverse members 52, which extend transversely across the pyrolyzing chamber and support at least two longitudinal runners 53. Similarly, the return flight support means 51 comprises transverse members 54 and at least two runners 55.

As shown in FIG. 3, the conveyor drum 44 at the infeed end of the pyrolyzing chamber 21 is adapted so that it may be moved horizontally and set in various positions. This adjusting movement enables the distance between the drum 44 and the drum 45 to be adjusted to accommodate conveyor belts of somewhat different lengths. In the illustrated preferred form of the invention, the conveyor drum 44 is mounted for rotation on sealed bearing structures 58 which are supported on either side of the chamber 21 by an infeed drum mounting wall 60 located inside the chamber. Each bearing structure 58 is adapted so that it may be fixed in various positions along a horizontal slot 59 in the infeed drum mounting wall 60.

The preferred embodiment of the conveyor means 36 shown in FIG. 4 includes tensioning means 65 for taking up slack in the conveyor belt 42 and maintaining proper tension on the belt during operation. The tensioning means 65 includes a stationary roller 66 and a biased roller 67, both extending transversely across the chamber 21. The biased roller is biased upward at both ends by biasing means such as a spring 68. The stationary roller 66 and the biased roller 67 are each adapted for rotation about their respective longitudinal axis, and are supported at their ends by a drum mounting wall 70 located inside the chamber on either side. In the illustrated preferred form, the biased roller 67 is mounted at either end on a sealed bearing structure 72, which is adapted to move freely in a vertical slot 73 in the wall 70 inside the pyrolyzing chamber 21.

To increase the tension on the belt 42, the conveyor drum 44 may be moved away from the other conveyor drum 45, thereby taking up any excess slack in the belt 42. The tensioning means 65 takes up the remainder of the slack in the belt 42 and keeps the belt taut on the conveyor drums 44 and 45, even though the length of the belt 42 changes during operation of the pyrolyzing system, due to thermal expansion and contraction.

As shown in FIGS. 3, 4, and 5, the pyrolyzing chamber 21 includes a drain pan 37 located below and extending substantially the entire length of the conveyor belt 42 between the conveyor drums 44 and 45, in position to collect liquid pyrolysate as it is liberated from the tire shreds and drips through the belt. The drain pan 37 slopes downward transversely at an angle of about 15° to the horizontal, toward a drain side 76 of the pyrolyzing chamber 21. Liquid pyrolysate, which falls through the belt 42, drains off along the drain pan 37 toward a number of drain side outlets 77 and into the fluid pyrolysate drain manifold 27.

The pyrolyzing chamber 21, as illustrated in FIG. 5, is supported on the substructure 22, and includes a bottom panel 78, a side panel 79, and a drain side panel 80, each panel having a layer of insulating material 81, preferably mironite. The roof panel 82 is made of an insulating material, also preferably mironite. In the illustrated preferred form, the roof panel 82 is made up of a number of panel sections, each section separated and supported partially by T-section rails 83 (FIG.3), which extend transversely across the chamber 21, and serve to unify the panel sections into the single air-tight roof panel 82.

FIG. 5 also shows upper belt support members 84 extending from the side panels in position to help support the belt 42 along its top flight. Lower belt support members 85 are positioned to help support the belt along its return flight. Also, the upper belt support members 84 each have an angled shred containment member 86 that extends along the top flight of the conveyor belt 42 in position to help keep tire shreds on the belt as they are conveyed through the chamber 21 for pyrolysis.

Figure 6:
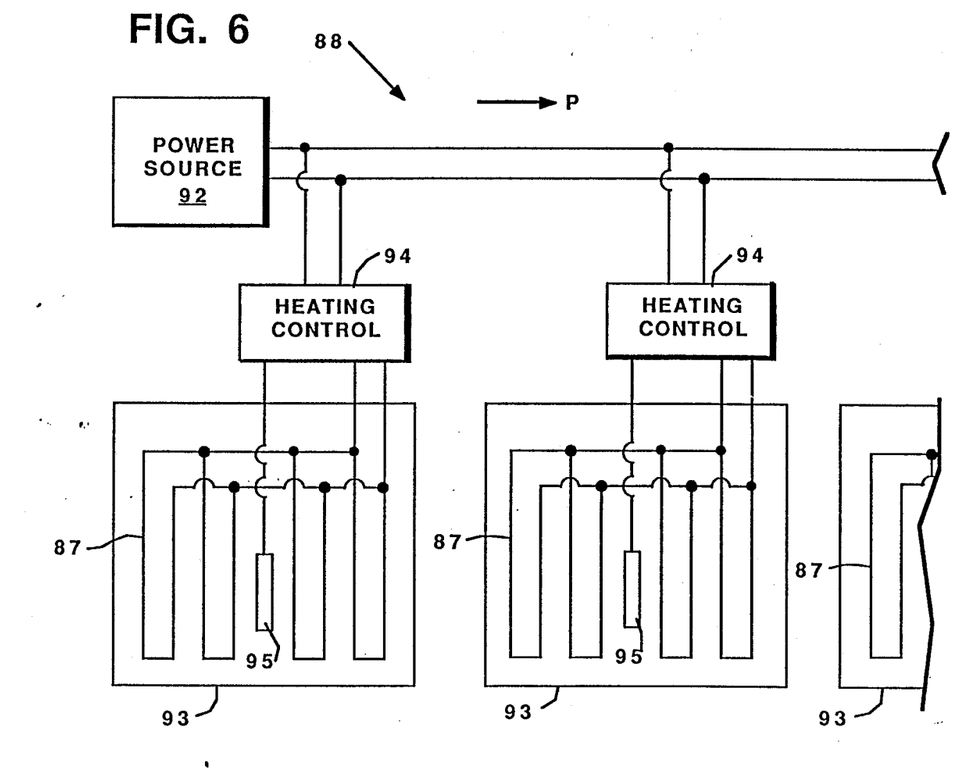
FIG. 6 is a mostly schematic, fragmentary top plan view of a preferred form of the heating means according to the invention.

In the preferred form of the invention shown in FIGS. 3, 4, and 5, the chamber 21 also includes a number of horizontally mounted heating elements 87, which are part of the heating means 88 shown schematically in FIG. 6. The heating elements 87 extend across the top of the pyrolyzing chamber 21 and are located a few inches above the conveyor belt 42 as it travels along its top flight, and preferably about 1.5 inches above the top of the layer of tire shreds on the conveyor belt 42.

The heating elements 87 are preferably electrical heating rods or cal rods which generate heat in response to an electrical current. As shown in FIG. 5, the rods 87 are suspended by a number of mounting members 89 which depend from the insulating roof panel 82. The rods 87 have electrical connector ends 90, which extend above the roof panel 82 in position to connect to electrical lines shown schematically in FIG. 6. Also, the rods 87 are preferably coated with a protective coating that protects them from damage if they come into contact with tire shreds as the shreds are conveyed through the chamber 21. The protective coating may be of the type commonly used to coat the electrical heating rods of household ovens. The illustrated pyrolysis system includes a protective lid or covering 91 for covering the connector ends 90 of the rods 87 and the electrical lines (shown schematically in FIG. 6) that are mounted above the roof panel 82.

As shown in FIG. 6, the heating rods 87 are powered by an electrical power source 92, so that the temperature increases gradually from the infeed end 34 (FIG. 3) of the chamber 21 to the solids output end 35 (FIG. 4). For example, the temperature may be maintained at approximately 450° F. at the infeed end 34 of the chamber 21, and gradually increased up to about 900° F. at the solids output end 35 of the chamber.

A gradual increase in temperature along the length of the pyrolyzing chamber 21 is preferably accomplished by dividing the electrical rods 87 into several separately controlled sections 93. Each heating element section 93 includes a number of heating elements or rods 87, and is separately controlled by thermostatic control means 94 each having a thermocouple 95 for providing temperature feedback. Individual temperature control for each heater element section 93 facilitates the preferred gradual temperature increase over the length of the chamber 21 in the processing direction P.

Once deposited on the conveyor belt 42, the tire shreds are leveled by levelling means 39, shown best in FIG. 3, included in the pyrolyzing chamber 21. Shred levelling is important because the distance between the shreds on the belt 42 and the heating elements 87 is critical to proper pyrolyzation of the shreds. For example, were the shred layer is too thick, the shreds at the middle of the layer might be insulated so as to prevent them from being heated sufficiently to be fully pyrolyzed. Also, if the shred layer is too thick in places on the belt, some shreds may touch and damage the heating elements 87 as the shreds are conveyed through the chamber 21.

The levelling means 39 includes a generally horizontal levelling rod 96 extending transversely across the top of the pyrolyzing chamber 21 in position to meter out a uniform layer of tire shreds as the belt 42 travels in the process direction. The illustrated levelling rod 94 is mounted at both ends for rotation about its longitudinal axis and includes a levelling tab 97.

In order to recover the maximum amount of valuable liquid and gaseous hydrocarbons from the tire shreds, the pyrolysis process must be substantially anaerobic. If substantial oxygen is introduced into the pyrolyzing chamber 21, the hydrocarbons will combust to release energy and form less valuable or otherwise less desirable chemicals. Furthermore, gaseous hydrocarbons must be contained within the chamber 21 and not allowed to escape into the atmosphere as tire shreds are introduced and as solid and liquid pyrolysate is removed from the chamber 21.

The continuous pyrolysis system 20 includes infeed means 23 for feeding tire shreds into the chamber 21, and solids output means 26 for removing solid pyrolysate from the pyrolyzing chamber. The system 20 also includes the fluid pyrolysate drain manifold 27 for draining gas and liquid pyrolysate from the chamber 21 for removal from the system through the gas outlet line 29, and liquid pyrolysate output means 30, respectively. The infeed means 23, solid output means 26, fluid drain manifold 27, gas outlet line 29, and liquid pyrolysate output means 30 are all specially adapted to operate without introducing a substantial amount of air into the pyrolysis chamber 21 and without allowing a substantial amount of pyrolysate gas to escape into the atmosphere. These specially adapted infeed and output means enable the system to recover the maximum amount of valuable products from the tire shreds.

As illustrated in FIG. 3, the tire-shred infeed means 23 is located at the infeed end 34 of the pyrolyzing chamber 21, in position to deposit tire shreds onto the conveyor belt 42. The infeed means 23 includes an upper hopper portion 101 and a hopper throat portion 102, both extending transversely across the chamber 21 over substantially the entire width of the belt 42 inside the chamber. An airlock means 103 is mounted in the hopper throat portion 102 for maintaining a constant seal to prevent substantial amounts of gas from exiting or entering the pyrolysis chamber 21 through the infeed means 23.

Figure 9:
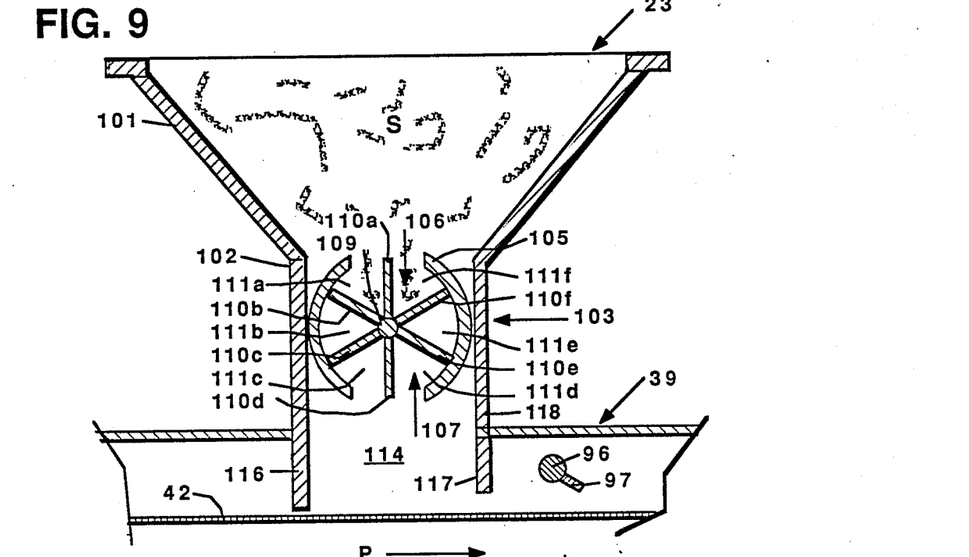
FIGS. 9, and 10 are partially diagrammatic side views in section illustrating progressively the operation of the infeed means of FIGS. 1 and 2.
Figure 10:
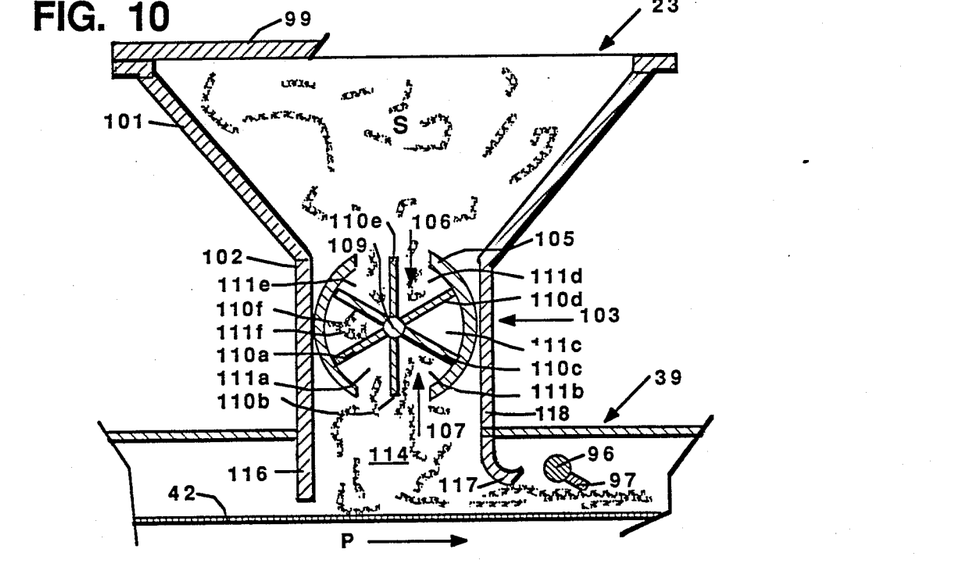

The airlock means 103, shown in greater detail in FIGS. 9 and 10, includes a generally tubular casing 105 extending substantially horizontally inside the hopper throat portion 102. The casing 105 has an upper opening 106 and a lower opening 107. An infeed shaft 109 is mounted for rotation coaxially with the casing 105. A number of sealing blades 110a-f are mounted on the infeed shaft 109, each blade extending substantially the length of the casing 105, that is, with their ends very near the end walls of the hopper throat portion 102. The sealing blades 110a-f also each extend substantially radially outward from the infeed shaft 109 to very near the inner wall of the casing 105, forming a number of pie-slice-shaped areas 111a-f between adjacent sealing blades. Also, the sealing blades 110a-f are spaced at different angular orientations about the infeed shaft 109 so that regardless of the angular orientation of the infeed shaft, two sealing blades extend radially to form a sealing arrangement against the casing 105 on both sides of the infeed shaft 109. Thus, regardless of the angular orientation of the infeed shaft 109, the airlock 103 maintains a constant seal to prevent a substantial amount of gas from flowing either into or out of the chamber 21 through the hopper throat portion 102. Although the illustrated form of the invention includes six equally spaced sealing blades, other forms of the invention may include fewer blades spaced so that only one blade provides a seal on either side of the shaft.

The airlock 103 also includes a suitable infeed motor 112, shown diagrammatically in FIG. 2, for rotating the infeed shaft 109 about its longitudinal axis. Rotation of the infeed shaft 109 about its longitudinal axis allows tire shreds (shown in FIGS. 9 and 10) to pass from the upper hopper portion 101 through the airlock 103 and into a lower throat area 114 inside the chamber 21 and above the conveyor belt 42.

A wall 116 of the hopper throat portion 102 extends downward into the pyrolyzing chamber 21 to very near the conveyor belt 42. This extended hopper wall 116 prevents shreds from falling off the conveyor belt 42 toward the infeed end 34 of the pyrolyzing chamber 21. A lip 117 of flexible material extends from the forward wall 118 of the hopper throat portion 102, also into the pyrolyzing chamber 21. The lip 117 extends transversely substantially the entire width of the pyrolyzing chamber 21 in position to contact tire shreds as they are conveyed by on the conveyor belt 42.

The extended hopper wall 116 and the lip 117 enable the infeed means 23 to be operated so that the lower throat area 114 is substantially packed full of tire shreds. The packed tire shreds help block the flow of gases into or out of the chamber 21 through the infeed means 23. Although the body of tire shreds packed in the lower throat area 114 is not completely impermeable to gas, the shreds, when packed together, do provide substantial resistance to prevent gas from flowing therethrough.

Figure 7:
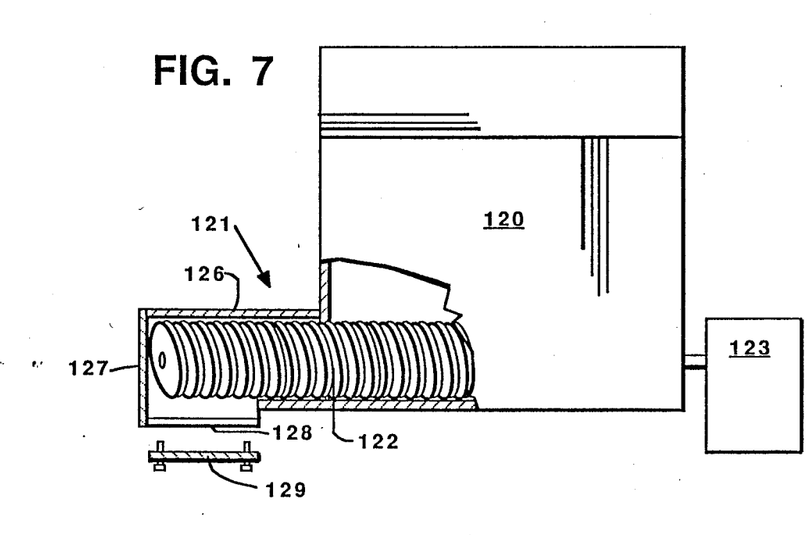
FIG. 7 is a partially diagrammatic end view in elevation of the solids output chute of the pyrolysis system shown in FIG. 1, partially cut away to show the auger.

As shown best in FIGS. 4 and 7, the solid pyrolysate output means 26 includes a solids output chute 120 with an auger or screw-type conveyor 121.

The auger-type conveyor 121 includes an auger 122 mounted horizontally in the bottom of the chute 120 and extending across the entire width of the chute, and out one side thereof. An auger motor 123 rotates the auger 122 to remove solid pyrolysate that collects in the bottom of the chute 120. A substantially tubular auger casing 126 encases the portion of the auger 122 that extends outside the chute 120. The auger casing 126 includes an output box 127 with an opening 128 through which solid pyrolysate exits the pyrolysis system. In the illustrated preferred form of the invention, the opening 128 in the output box 127 is adapted to be covered by a sealing plate 129 when the auger is not operated.

The auger 122 is operated only when an amount of solid pyrolysate is accumulated in the bottom of the chute 120 above the level of the auger 122. This collected pyrolysate effectively blocks air which might otherwise enter the chute 120 and the pyrolyzing chamber 21, and prevents substantial amounts of pyrolysate gas from escaping from the chamber 21. During system start up, before solid pyrolysate has collected in the chute 120, the sealing plate 129 is used to cover the opening 128 of the output box 127. The sealing plate 129 provides a positive seal for preventing gas from entering or leaving the system through the chute 120. Thus, the output chute 120, auger 122, and auger casing 126 arrangement allows the removal of solid pyrolysate while preventing air from entering the pyrolyzing chamber 21 or allowing gas pyrolysate to escape from the system, thereby maximizing recovery of valuable pyrolysate gas and liquid.

The fluid pyrolysate drain manifold 27, shown in its entirety in FIGS. 1 and 2, drains liquid and gas pyrolysate from the pyrolysate chamber 21 for removal from the system without introducing air into the chamber and without allowing gas pyrolysate to escape into the atmosphere. Gas pyrolysate exits the system 20 through the gas outlet 29 and liquid pyrolysate exits the system through the separate liquid removal means 30.

Figure 8:
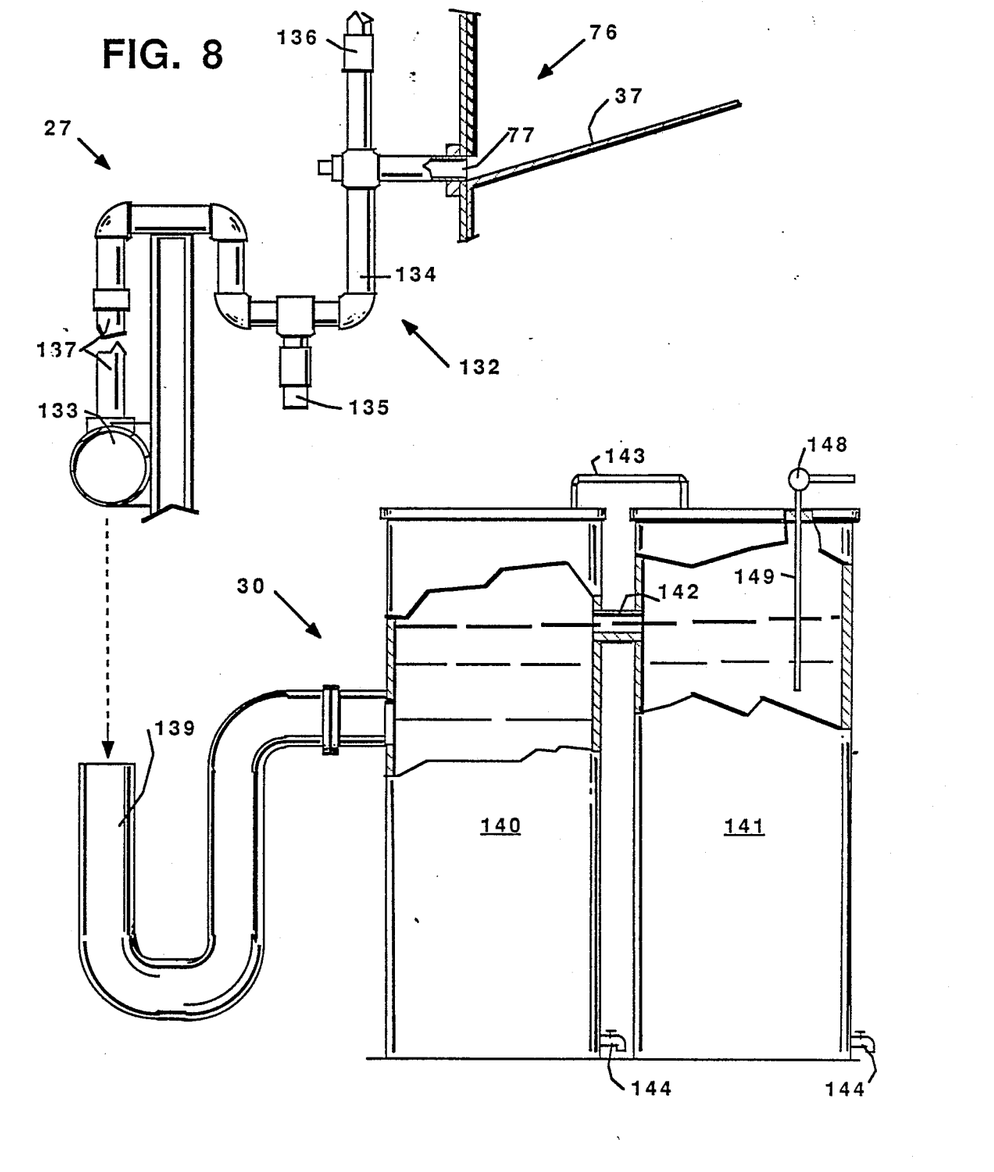
FIG. 8 is a partially diagrammatic fragmentary view in section and in elevation of the liquid pyrolysate output means and the drain manifold of the pyrolyzing system shown in FIGS. 1 and 2.

The pyrolysate drain manifold 27 includes a number of drain tubes 132, and a single sloped collection tube 133. FIG. 8 shows a preferred form of one of the drain tubes 132, each connected to one of the outlets 77 on the drain side 76 of the pyrolyzing chamber 21 for draining fluid pyrolysate from the chamber. Each drain tube 132 includes a U-section 134 with an oil test outlet 135, a gas test outlet 136, and a riser tube 137 that leads down to the collection tube 133. The collection tube 133 extends substantially the entire length of the pyrolyzing chamber 21, as shown in FIGS. 1 and 2, and slopes downward toward the liquid pyrolysate output means 30.

As illustrated in FIGS. 1, 2, and 8, the collection tube 133 is connected at its lower end to the liquid output means 30. The liquid pyrolysate output means 30 includes a U-section 139 positioned below the collection tube 133, an intermediate liquid pyrolysate tank 140, and an output tank 141. The intermediate tank 140 and the output tank 141 are connected by a liquid pyrolysate transfer line 142 located slightly above the level of the U-section 139, and a gas pyrolysate equalizing line 143 extending between the tops of the two tanks. Both tanks 140 and 141 also preferably include valved cleanout outlets 144. In the illustrated preferred form of the invention, liquid pyrolysate is removed from the output tank 141 by a suitable pump 148 having a pump suction line 149 extending into the tank 141 to a point below the level of the liquid pyrolysate line 142 that connects the two tanks 140 and 141.

In accordance with the method of the invention, tire shreds, preferably having dimensions of about one-half inch by one-half inch, are supplied to the infeed means 23 at the infeed end 34 of the pyrolyzing chamber 21. The operation of the infeed means 23 is illustrated in FIGS. 9-10.

FIG. 9 shows the infeed means 23 with the upper hopper portion 101 full of tire shreds S. At this particular angular orientation of the infeed shaft 109, the sealing blades 110b, 110c, 110e and 110f are in a sealing arrangement with the casing 105. Also in this orientation, the pie-slice-shaped areas 111a and 111f are aligned with the upper casing opening 106 so that tire shreds have filled those areas.

FIG. 10 shows the infeed means 23 after the infeed shaft 109 has been rotated a number of times by the infeed motor 112 (FIG. 2). As the infeed shaft 109 has rotated counterclockwise, the previously tire shred filled areas 111a and 111b have been rotated counterclockwise and have reached the lower casing opening 107, which enabled the tire shreds therein to fall into the lower throat area 114. At the same time, tire shreds S have filled areas 111d-f between adjacent sealing blades, as the areas passed by the upper casing opening 106. Thus, as the infeed shaft 109 is rotated through about 180° of rotation, tire shreds pass through the airlock 103 even though, in the illustrated embodiment, at least two pairs of oppositely extending sealing blades are constantly maintained in a sealing arrangement with the casing 105.

Also as illustrated in FIG. 10, the conveyor belt 42 is operated at such a speed and the infeed shaft is rotated at an angular velocity such that the lower throat area 114 of the infeed means 23 is kept substantially full of tire shreds S. The shreds S pack together and help to block the flow of any gas through the lower throat area 114 of the infeed means 23.

The upper hopper portion 101 is adapted to receive a sealing lid 99. As previously discussed, in normal continuous operation of the pyrolysis system, the lower throat area 114 is packed full of tire shreds which help prevent gas from flowing therethrough. However, when it is desired to stop the pyrolysis system, for example when a supply of tire shreds is exhausted, the hopper sealing lid 99 may be placed over the upper hopper portion 101 to provide a backup seal for the airlock 103. The sealing lid 99 is placed over the upper hopper portion 101 after the last shreds S are fed into the upper portion 101.

FIG. 10 also illustrates the levelling action of the levelling means 39. When the area 114 is full of shreds S, the levelling rod 96 and the tab 97 meter out a uniform layer of shreds as the belt 42 travels in the process direction P. The levelled shreds continue in the direction P through the length of the pyrolyzing chamber 21. As the shreds pass under the heating elements 87 (FIGS. 3 and 4), they are gradually pyrolyzed to form gas, liquid, and solid pyrolysate.

The liquid pyrolysate passes downward through the fine mesh conveyor belt 42 and collects at the sloped drain pan 37 in the pyrolyzing chamber 21. The solid pyrolysate and nonpyrolyzed material, such as steel belt material, remains supported by the conveyor belt 42 and is conveyed the length of the pyrolyzing chamber 21 to the solids output means 26 at the solids output end 35 of the chamber.

The heating elements 87 preferably maintain the temperature in the chamber 21 at about 450° F. at the input end 34, gradually increasing to about 900° F. at the solids output end 35 of the chamber. At these temperatures, and with the layer of shreds being about 2.5 to 3 inches thick, the residence time required for complete pyrolyzation of the shreds in the pyrolyzing chamber is approximately 18 minutes.

As the conveyor belt 42 travels around the drum 45 at the solids output end 35 of the chamber 21, the solid pyrolysate falls off into the chute 120 and collects at the bottom of the chute around and above the removal auger 122. Preferably a series of scraper chains 150 are positioned to contact the conveyor belt 42 and help remove solid pyrolysate from the belt so that it falls into the chute 120 for removal. The removal auger 122 is driven by its motor 123 to remove the collected pyrolysate out one side of the chute 120, through the auger casing 126 and finally out the opening 128 in the output box 127. During start up of the system, before solid pyrolysate has collected in the chute 120, the auger 122 is not operated and the sealing plate 129 is used to cover the opening 128 in the output box 127 to prevent gas from flowing through the opening.

As discussed above, it is necessary to keep the pyrolysis of tire shreds an anaerobic process; therefore, it is crucial that no air be allowed to enter the pyrolyzing chamber 21 during operation. Thus, in addition to the specially designed infeed and output means previously discussed, the chamber 21 itself is substantially air-tight and adapted so that it can be operated at slightly above atmospheric pressure. The slight gauge pressure on the pyrolyzing chamber 21 further helps prevent air from entering the chamber and destroying anaerobic conditions.

As the shreds are pyrolyzed, the gas pyrolysate that is liberated from the tire shreds collects in the chamber 21. Since the infeed means 23 and the solid output means 26 are adapted to prevent gas from exiting the chamber 21, and since the chamber itself is a pressure vessel, the only exit for the gas is through the drain side outlets 77 (FIG. 5) and the fluid drain manifold 27. The gas segregates to the top of the collection tube 133 and exits the system through the gas outlet 29. In one form of the invention, the gas outlet line 29 may lead to gas conditioning equipment such as a gas condenser (not shown).

Liquid pyrolysate segregates to the bottom of the collection tube 133 and flows into the U-section 139 of the liquid output means 30. From the U-section 139, liquid pyrolysate flows into the intermediate tank 140. The level of liquid in the intermediate tank 140 is controlled by the liquid pyrolysate transfer line 142, which leads to the output tank 141. Once the level of liquid in the intermediate tank 140 reaches above the line 142, the liquid pyrolysate begins to flow into the output tank 141 for removal by the pump 148 through its suction line 149. Thus, as long as the level of liquid in the output tank 141 is maintained even with or below the level of the line 142, the liquid level in the intermediate tank 140 is held substantially constant.

When the pyrolysis system is started, the U-section 139 of the liquid pyrolysate output means 30 is filled to a certain level with an oil preferably having a specific gravity similar to that of the liquid pyrolysate. This oil prevents air from entering the system, even if the intermediate tank 140 is empty. Also, the oil in the U-section 139 prevents pyrolysate gas from flowing into the liquid pyrolysate output means 30.

At start up, the entire chamber 21, output chute 120, and fluid output manifold 27 are purged with nitrogen or other suitable gas, which is supplied by the purging system 32. During operation, the nitrogen or other suitable gas is displaced by the gas pyrolysate and exits the system through the gas outlet line 29.

In a preferred form the pyrolyzing system also includes an oxygen detection system for providing a signal when oxygen is present in the chamber 21. As shown schematically in FIGS. 3 and 4, oxygen sensors 152 should at least be positioned near the infeed means 23 and in the solids output means 26 where oxygen is most likely to be introduced. However, the sensors may preferably be positioned at regular intervals throughout the system.

The above described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. A continuous pyrolysis system for pyrolyzing tire shreds, comprising:
    an anaerobic pyrolyzing chamber in which tire shreds are pyrolyzed to form solid, liquid, and gas pyrolysate,
    infeed means for feeding tire shreds to be pyrolyzed into the pyrolyzing chamber without introducing a substantial amount of air into the pyrolyzing chamber, and without allowing a substantial amount of gas pyrolysate to escape from the chamber into the atmosphere,
    fluid pyrolysate output means for removing fluid pyrolysate from the pyrolyzing chamber without introducing a substantial amount if air into said chamber,
    said fluid pyrolysate output means including:
    a gas outlet line for removing gas pyrolysate form the pyrolysis system,
    liquid pyrolysate output means for removing liquid pyrolysate from the pyrolysis system, and
    fluid pyrolysate drain means for draining gas pyrolysate from the pyrolyzing chamber to the gas outlet line, and for draining liquid pyrolysate from the pyrolyzing chamber to the liquid pyrolysate output means,
    solid pyrolysate output means for removing solid pyrolysate from the pyrolyzing chamber without introducing a substantial amount of air into said chamber, and without allowing a substantial amount of gas pyrolysate to escape from the chamber into the atmosphere,
    heating means for heating tire shreds in the pyrolyzing chamber to a temperature sufficient for pyrolyzation, and
    conveyor means located within the pyrolyzing chamber for receiving tire shreds to be pyrolyzed that are fed into the pyrolyzing chamber by the infeed means, for conveying the received tire shreds through the pyrolyzing chamber where they are pyrolyzed to form fluid and solid pyrolysate, and for delivering solid pyrolysate to the solid pyrolysate output means so that said solid pyrolysate can be removed from the pyrolyzing chamber,
    whereby tire shreds to be pyrolyzed are fed into the pyrolyzing chamber, and solid and fluid pyrolysate is removed from the pyrolyzing chamber simultaneously with pyrolyzation of tire shreds being conveyed through the pyrolyzing chamber by the conveyor means,
    said liquid pyrolysate output means including:
    an output tank from which liquid pyrolysate is removed from the pyrolysis system,
    an intermediate tank connected to the output tank by a liquid pyrolysate transfer line and a gas equalizing line, and
    a U-section connecting the lower end of the collection tube to an intermediate tank, said U-section being filled with a U-section liquid having substantially the same specific gravity as liquid pyrolysate, said U-section liquid blocking gas from flowing into or out of the collection tube through the U-section,
    whereby liquid pyrolysate may flow from the collection tube of the fluid drain means through the U-section to the intermediate tank, and through the liquid pyrolysate transfer line into the output tank for removal from the pyrolysis system.

2. The pyrolysis system of claim 1 including pumping means for pumping liquid pyrolysate out of the output tank.

3. The pyrolysis system of claim 1 wherein the fluid pyrolysate drain means includes:
    a collection tube mounted outside the pyrolyzing chamber and extending at an acute angle to the horizontal substantially the length of the chamber so as to have an elevated upper end and a lower end somewhat below the level of the upper end, said gas outlet line and said liquid pyrolysate output means being connected to the collection tube near the lower end to enable gas from the collection tube to flow into said gas outlet line and liquid to flow into said liquid pyrolysate output means, and
    a plurality of drain tubes at spaced apart locations along the length of the pyrolyzing chamber, each drain tube connected at one end to a different drain outlet in the pyrolyzing chamber, and connected at its other end to the collection tube such that fluid can drain from the pyrolyzing chamber through the drain tube and into the collection tube.

4. A method for continuous pyrolysis of tire shreds with simultaneous recovery of solid, liquid, and gas pyrolysate, comprising the steps of:
    continuously feeding tire shreds to be pyrolyzed into an anaerobic pyrolyzing chamber without introducing a substantial amount of air into the chamber, and without allowing substantial amounts of gas pyrolysate to escape from the pyrolyzing chamber,
    conveying the fed tire shreds through the pyrolyzing chamber from an infeed end of the chamber toward a solids output end,
    heating the conveyed tire shreds to a pyrolyzing temperature to produce solid, liquid, and gas pyrolysate,
    removing fluid pyrolysate from the pyrolyzing chamber simultaneously with said feeding, conveying, and heating, without introducing a substantial amount of air into the pyrolyzing chamber including
    draining gas pyrolysate from the pyrolyzing chamber to a gas outlet line and
    draining liquid pyrolysate from the pyrolyzing chamber into a liquid output tank,
    wherein the step of draining liquid pyrolysate chamber includes draining liquid pyrolysate through a U-section which is maintained substantially filled with liquid which blocks the flow of gas therethrough, and
    removing solid pyrolysate from the pyrolyzing chamber simultaneously with said feeding, conveying, and heating, without introducing a substantial amount of air into the chamber and without allowing a substantial amount of pyrolysate gas from escaping into the atmosphere.

* * * * *